United States Patent

[11] 3,574,289

[72] Inventors Milton H. Scheiter
 Bloomfield Hills;
 Frank Dickenbrock, Warren, Mich.
[21] Appl. No. 822,122
[22] Filed May 6, 1969
[45] Patented Apr. 13, 1971
[73] Assignee General Motors Corporation
 Detroit, Mich.

[54] TRANSMISSION AND CONTROL SYSTEM
 20 Claims, 6 Drawing Figs.
[52] U.S. Cl. ................................................ 74/864,
 74/691, 74/867
[51] Int. Cl. .............................................. B60k 21/10,
 F16h 37/06
[50] Field of Search ......................................... 74/730,
 690, 691, 865, 867, 740, (Cursory), 863, 864, 855,
 790(Inquired)

[56] References Cited
UNITED STATES PATENTS
1,833,475 11/1931 Standish ...................... 74/690
3,106,100 10/1963 Tomaszek et al. ............ 74/690X
3,242,753 3/1966 Standing et al. .............. 74/865X
3,244,025 4/1966 Francisco ..................... 74/690
3,394,617 7/1968 Dickenbrock ................ 74/730
3,406,597 10/1968 Perry et al. ................... 74/691X
3,410,146 11/1968 Mordeen ....................... 74/200

Primary Examiner—Arthur T. McKeon
Attorneys—Warren E. Finken, A. M. Heiter and John P. Moran ABSTRACT: A friction roller transmission including a prime mover, shaft means driven thereby, a pair of input races secured to the shaft means, a pair of output races secured to output shaft means, a set of rollers frictionally rotatable and tiltable between each set of input and output races for permitting continuously variable output/input speed ratios, hydraulic control means for automatically changing the tilt position of the rollers in order to select desired speed ratios in response to three variable input parameters, differential means for averaging speed differences between toric sections as received from the output shaft means, gear means for transferring the rotary output from the differential means to a fluid torque converter, first clutch means for connecting a final output shaft to the converter for forward vehicle operation, and second clutch means for connecting the final output shaft to the converter for reverse vehicle operation.

INVENTORS
Milton H. Scheiter, &
BY Frank Oickenbrock
John P. Moran
ATTORNEY

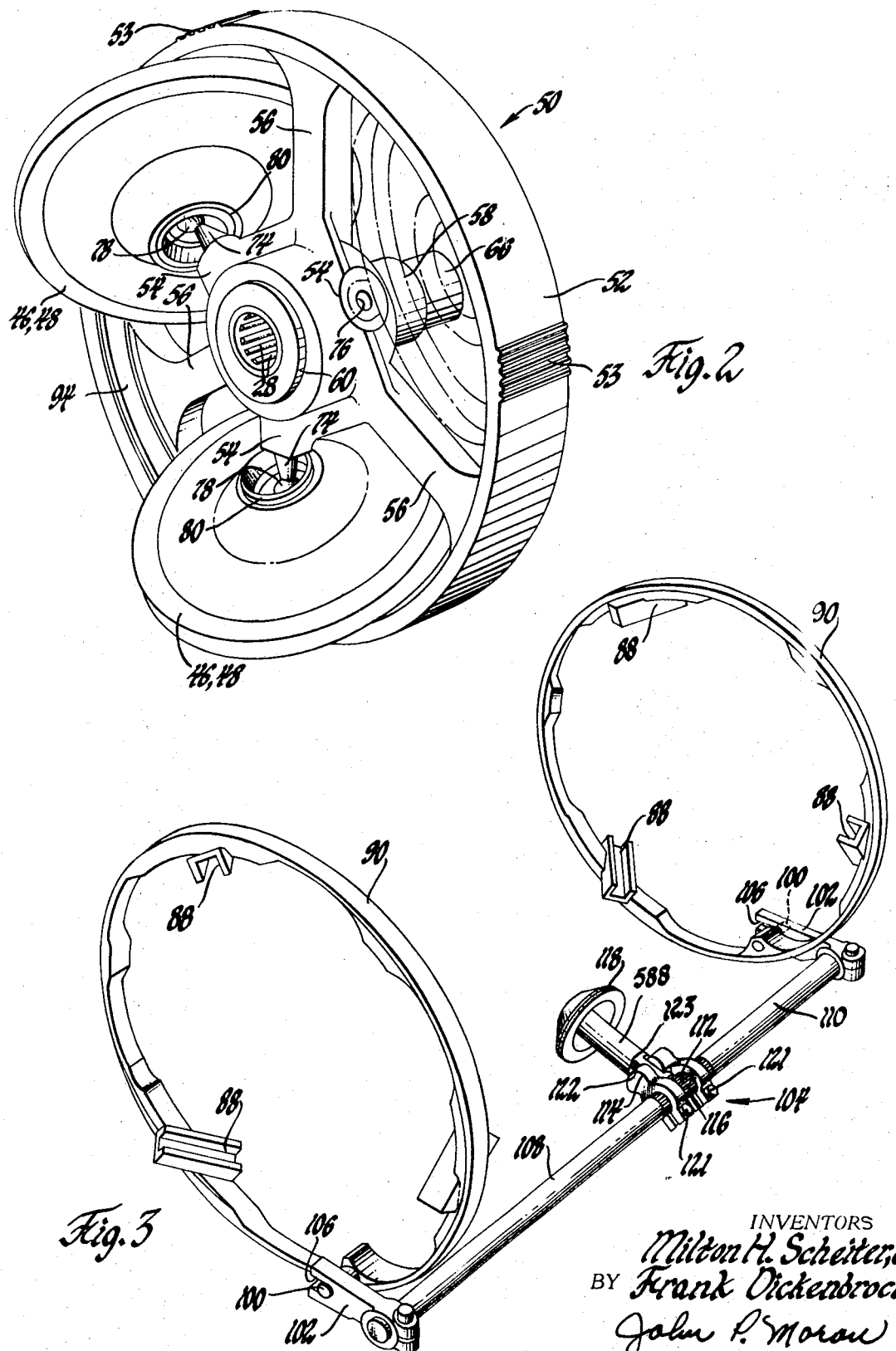

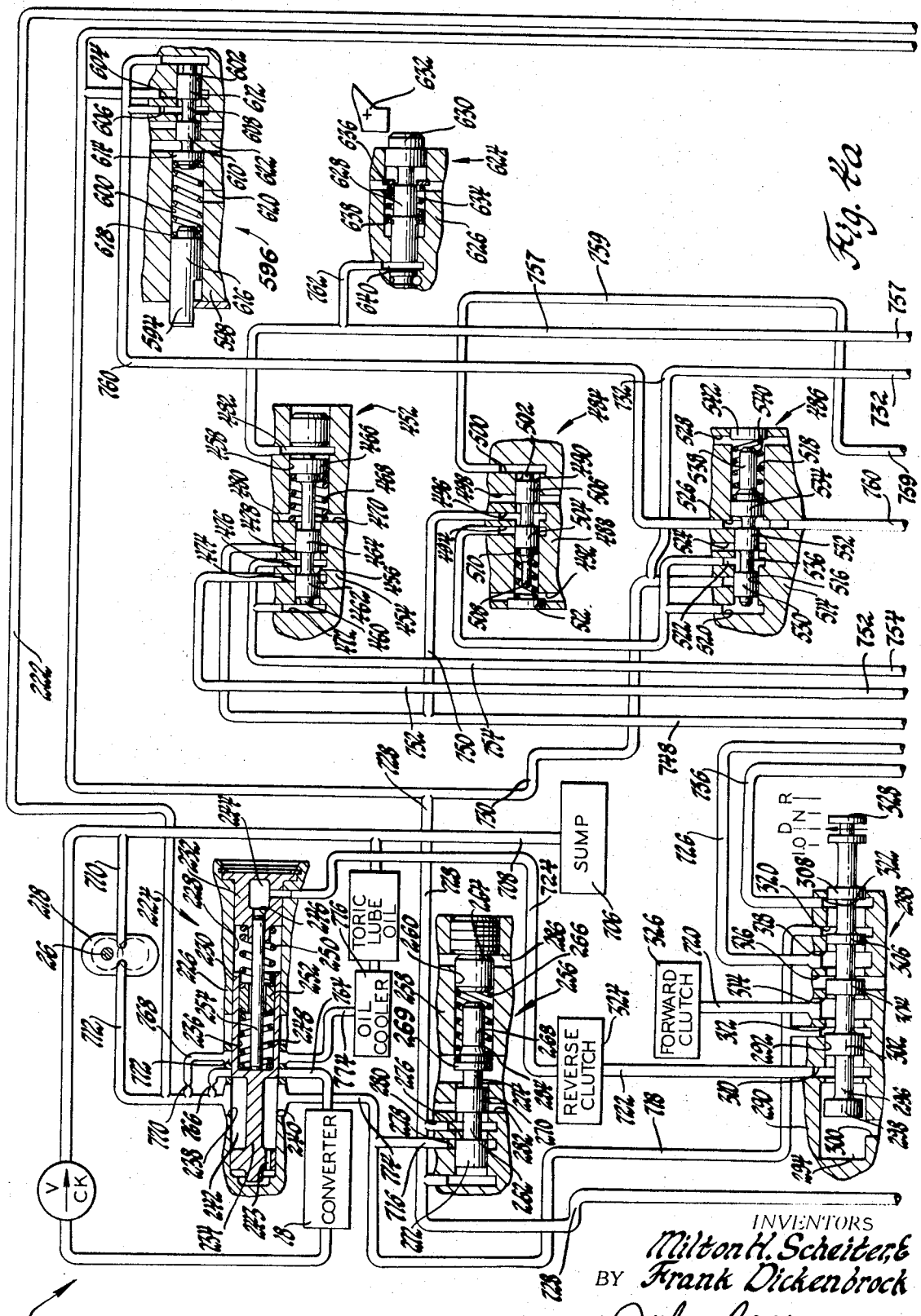

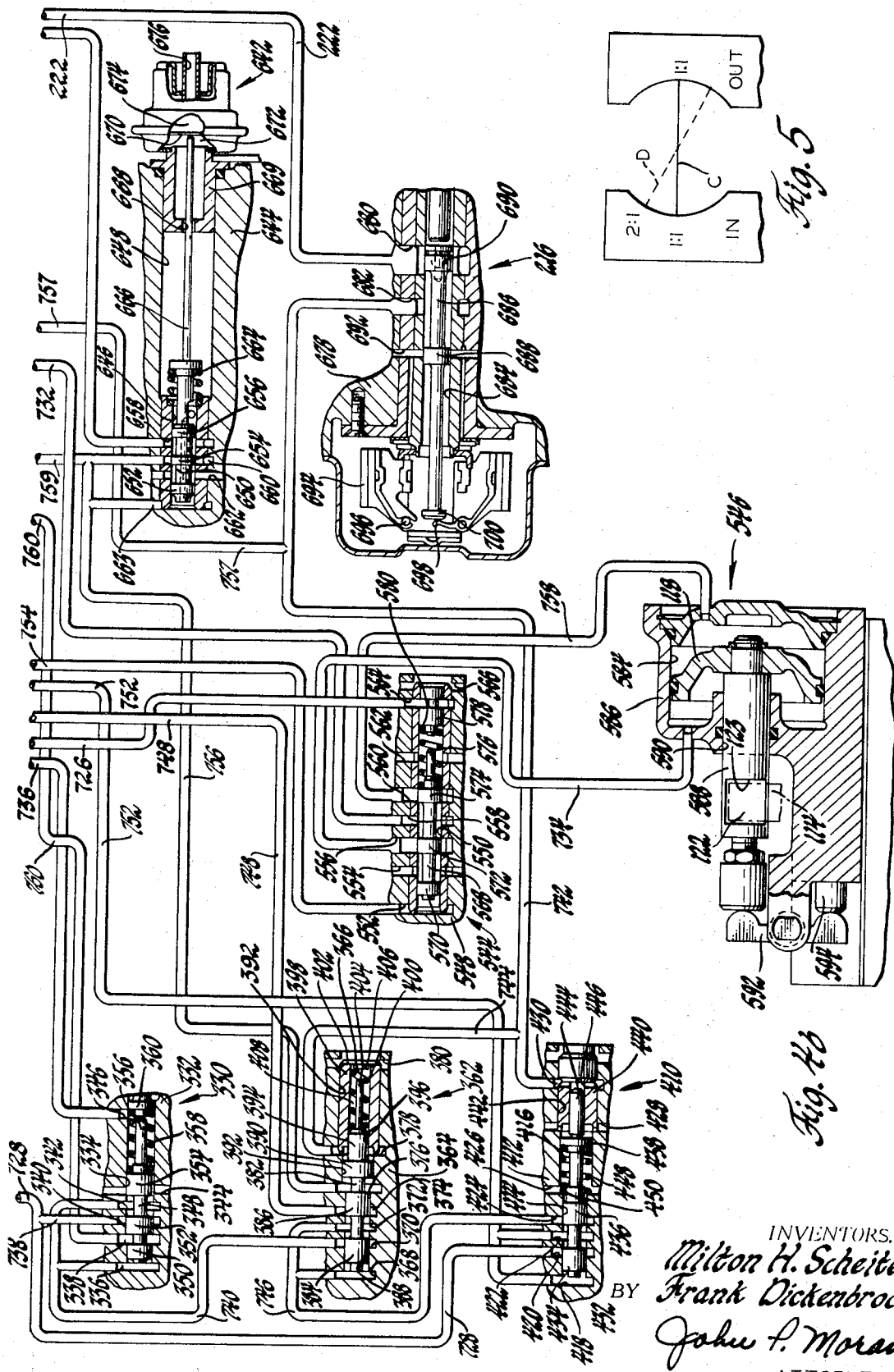

TRANSMISSION AND CONTROL SYSTEM

This invention relates to automotive transmissions and, more particularly, to friction roller transmissions.

There is a current application on busses and trucks for a gas turbine engine drive, coupled with a so-called "gearless," or continuously variable ratio, friction roller or "toric" transmission which provides smooth, shift-free, and substantially noiseless forward operation, with reverse operation being readily provided by a clutch and planetary gear arrangement.

Accordingly, a primary object of the invention is to provide a toric transmission which may be used with a gas turbine engine for producing the proper drive ratio under all operating conditions without any "shift feel" or noticeable change in inertia, and with minimal noise characteristics.

Another object of the invention is to provide such a toric transmission, wherein the toric section is located between the turbine prime mover and a fluid torque converter for (1) overdriving the fluid converter for extended acceleration performance and greater efficiency, (2) underdriving the fluid converter to effect a low driveline power loss when the vehicle is idling, and (3) allowing large accessory loads on the power turbine side of the engine without having to declutch the vehicle.

A further object of the invention is to provide a toric transmission, wherein a hydraulic servocontrol system, with a feedback loop, is used, employing three parameters, namely, power turbine speed, compressor discharge or pitot tube pressure, and manual ratio selection.

Still another object of the invention is to provide a toric transmission which includes (1) an operator-controlled clutch and gear arrangement for idle and reverse operations, and (2) a manual overcontrol to downshift the toric section.

Other objects and advantages of the invention will become apparent when reference is made to the following description and accompanying drawings, wherein:

FIGS. 2 and 3 are enlarged perspective views of portions of FIG. 1;

FIGS. 4a and 4b are schematic views of the hydraulic control system embodied in the invention; and FIG. 5 is a diagrammatic view of an operational characteristic of the invention.

Figure 1:
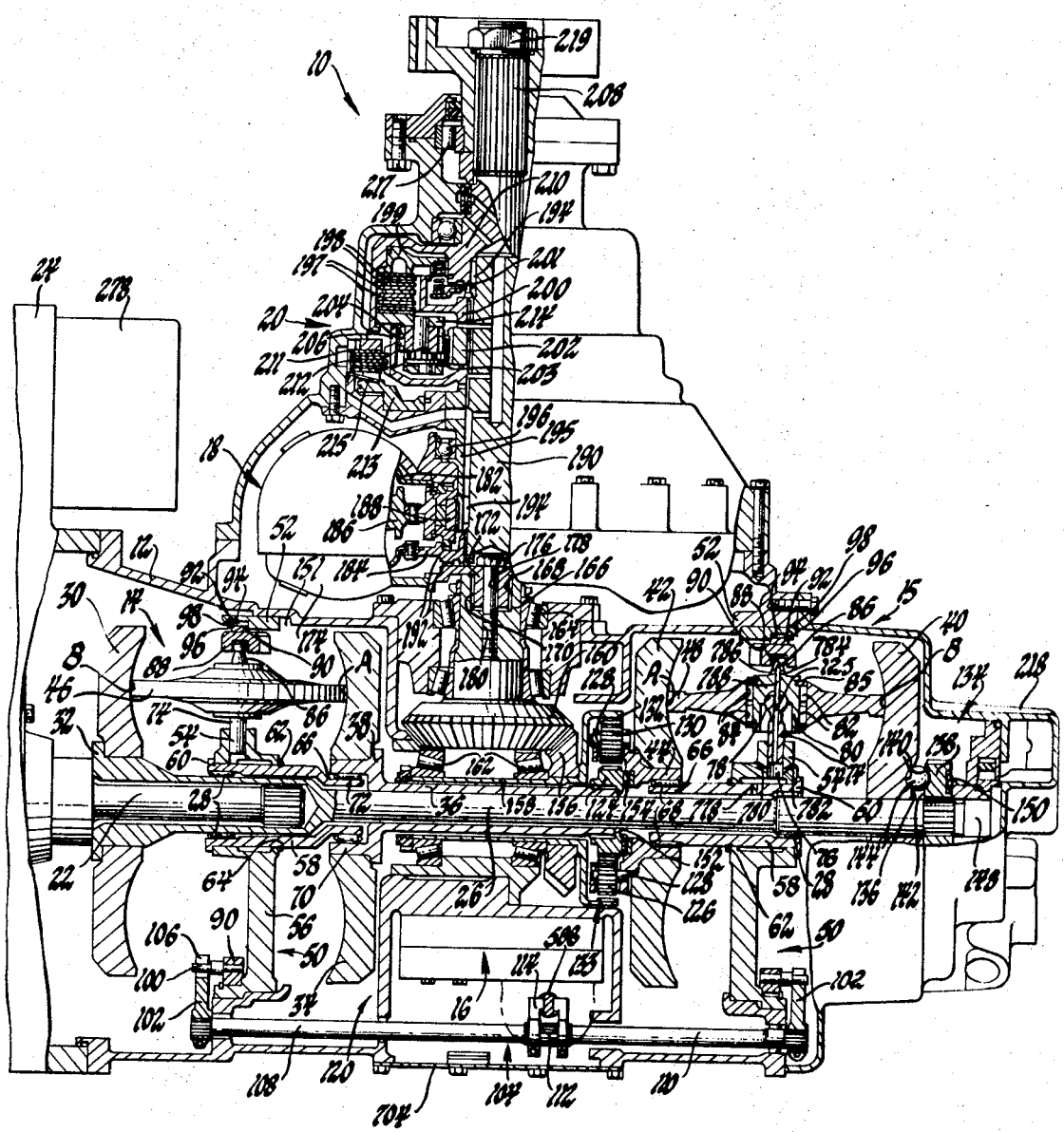
FIG. 1 is a cross-sectional view of a toric transmission embodying the invention.

Referring now to the drawings in greater detail, FIG. 1 illustrates a transmission 10, including a housing 12 having dual toric sections 14 and 15 and an associated hydraulic control system 16, a fluid torque converter 18 and a planetary-type reverse gearing mechanism 20 mounted therein. A power turbine-driven transmission shaft 22 extends into the housing 12 from a prime mover, such as a gas turbine engine, represented generally at 24. A transmission input shaft 26 is splined at its left end to the shaft 22 and extends axially through the housing 12, supported on needle bearings 28.

The toric section 14 includes a first input race 30 which is secured in a suitable manner on the transmission input shaft 26 adjacent a collar 32 formed on the leftmost end thereof, and a first output race 34 which is secured in a suitable manner to an output shaft 36 against a collar 38 formed adjacent the left-hand end thereof. The collar 38 is oppositely disposed form the input shaft collar 32. The toric section 15 includes a second input race 40 which is freely mounted around the right-hand end of the transmission input shaft 26, and a second output race 42 secured in a suitable manner to a carrier 44. The toric sections 14 and 15 each additionally includes two two three-roller assemblies rotatably mounted between the two sets of input (30 and 40) and output (34 and 42) races, respectively. While all the rollers are identical, each roller member of the left set (FIG. 2) is hereinafter designated as 46, and each roller member of the right set as 48.

It may be noted at this point that the power flow through the system is as follows:

The prime mover, in this instance, the gas turbine engine 24, will rotate the power turbine-driven transmission shaft 22. The shaft 22 will, in turn, rotate the transmission input shaft 26 and its associated input races 30 and 40. Rotation of the races input 30 and 40 will rotate the adjacent rollers 46 and 48, respectively. The rollers 46 and 48 will, in turn, rotate their respective output races 34 and 42. The speed of the output races 34 and 42 will be determined by the tilt position of the rollers 46 and 48, respectively. For instance, if the rollers 46 and 48 are tilted such that the input races 30 and 40 have pitch radii smaller than the pitch radii of output races 34 and 42, the resultant speed of the output races 34 and 42 will be at a lower speed ratio than the 1:1 ratio illustrated, speed ratio being defined as output speed/input speed. The manner in which the rollers 46 and 48 are tilted will be described later. The rotary speed of the output races 34 and 42 is transmitted to the fluid torque converter 18 by suitable means. The servocontrol system 16 will control the input speed/output speed ratio of the toric section. At 2.5:1 for idle operation, there will be insufficient output from the converter 18 to an output shaft connected thereto to move the vehicle on level ground. When the input-to-output speed ratio is 1:1 or less, there will be a corresponding performance output through the torque converter 18. When the planetary-type reverse gearing mechanism 20 is engaged, the resultant output will be in the opposite rotational direction, while the toric section remains in 1:1 speed ratio.

Considering now the toric roller sections 14 and 15 in greater detail, each set of rollers 46 and 48 is a part of an assembly which includes a spider member 50 which is secured concentrically by an outer ring 52 to the housing 12 in any suitable manner, such as splines 53 (FIG. 2). A central hub portion 54 is secured to the outer ring 42 by means of three spoke members 56 (FIG. 2), spokes 56 being located alternately with the rollers 46 and/or 48. A cylindrical member 58 is press-fitted in the hub portion 54, and restrained from axial movement by a collar 60 formed on an end of the member 58 and a retaining ring 62 mounted in a groove 64 formed in the outer surface of the member 58. An extension 66 is formed on the cylindrical member 58 and, in the case of the rear spider, extends into the carrier 44. The carrier 44 is rotatably mounted thereon by means of needle bearings 68. In the case of the front spider, the extension 66 extends into a counterbored end 70 of the output shaft 36. The end 70 is rotatably mounted on the extension 66 by means of needle bearings 72. Bearings 28, mounted in spider shafts 66, support and radially locate the input shaft 26 concentrically with spider member 50 and housing 12. As a result, all race elements are also concentrically mounted. A pin or mooring mast 74 is press-fitted in each radial opening 76 formed in the central hub member 54 and includes a ball-shaped pivot 78 which extends into the center of the rollers 46 or 48. A carrier 80 is spherically mounted on the ball-shaped pivot 78 and pilots the respective needle bearings 82 in an axial opening 84 formed in each of the rollers. Retaining rings 85, in respective grooves on carrier 80, axially restrain the needle bearings 82 in position while permitting rollers 46 and 48 to seek their independent location, as dictated by the front races 30 and 34 and rear races 42 and 40. The carrier 80 includes an extension 86 which extends radially outwardly therefrom into a groove 88 formed in ratio control collars 90. The ratio control collars 90 are rotatably mounted on an antifriction or needle bearing 92 in a concentric annular space 94 formed on the inside of the outer ring 52, the collar 90 being axially located therein by means of retaining rings 96 mounted in a groove 98 formed in the outer ring 52.

Referring now to FIG. 3, it may be noted that the slots or grooves 88 are angularly disposed on the collars 90. It may be further noted that pin members 100 are secured to the collars 90 extending in opposite outward directions therefrom. Crankarms 102 are formed on the ends of a shaft 104. Each of the crankarm members 102 includes a slot 106 formed therein into which the respective pin members 100 extend. The shaft 104 includes long and short portions 108 and 110, respectively, with an intermediate splined section 112. The diameters of the shaft extensions 108 and 110 are such that, when multiplied by their respective lengths, the same torsional force will be exerted on the fixed crankarm members 102. A pair of bellcranks 114, each having internal splines 116 formed therein, are mounted on the splined portions 112. A servopiston 118 extends from a housing 120, which houses the hydraulic system 16. The servopiston 118 has flats/formed on opposite sides thereof for pivotal confinement between the bellcrank members 114. The members 114 are secured to the shaft 104 by any suitable means, such as bolts 121, the axial position of the shaft 104 being determined by flats 123. Accordingly, any reciprocal movement of the servopiston 118, caused by a hydraulic signal which will be described later, will rotate the bellcrank members 114, as well as the shaft extensions 108 and 110 along with crankarm members 102. Rotation of the crankarm members 102 will act upon the pins 100, located in the slots 106, to rotate the front and rear control collars 90.

Since the slots 88 (FIG. 3) are angularly disposed on the inner surfaces of the front and rear control collars 90, it may be realized that, with the rollers 46 and 48 in the 1:1 output speed/input speed ratio position, as shown, the initial rotation of the slots 88 will cause each extension 86 of each roller carrier 80 to incline on a plane perpendicular to the shaft 26 axis within the limits permitted by one or more pins 125 mounted in aligned openings formed in the pivot 78 and the carrier 80 and as more fully explained in U.S. Pat. No. 3,394,617 issued on Jul. 30, 1968, in the name of Frank Dickenbrock, and in U.S. Pat. application Ser. No. 822,121, filed on May 6, 1969, in the name of Frank Dickenbrock. The rollers 46 and 48 will likewise be initially inclined about an axis running between the areas of contact A and B formed by the roller circumference and the adjacent input and output race toroidal surfaces, respectively. The roller inclination generates forces at the points of contact, A and B, with the respective input and output races, which causes the rollers 46 and 48 to tilt perpendicularly to their planes of inclination, causing the roller contacts to move in opposite radial directions along the toric surfaces formed on opposite faces of the front and rear input and output races 30 and 34, and 40 and 42, respectively, thereby changing the drive ratio. As each of the rollers 46 and 48 tilts, it pulls the carrier 80 and its associated extension 86 along with it, causing the extended end 86 to move along its respective slot 88 until the previously described angle of inclination has returned to zero. For each rotary position of the collars 90, there results a corresponding tilt angle for the rollers 46 and 48.

Whether the drive ratio is increased or decreased, i.e., whether contact point A (FIG. 1) tilts inwardly toward the axis of the transmission input shaft 26 or radially outwardly therefrom, with point B tilting a corresponding distance in the opposite radial direction (see FIG. 2 for illustration of tilt attitude), depends upon whether the ratio collars 90 are rotated initially in a clockwise direction or a counterclockwise direction by the crankarm members 102 (FIG. 3). If point A moves radially inwardly along the input races 30 and 40, and point point B moves radially outwardly along the output races 34 and 42, the resultant drive ratio will be increased, whereas radially outward movement of point A along the input races 30 and 40 will produce a decreased speed ration between the input and output races, as explained in the above-mentioned U.S. Pat. No. 3,394,617 and Pat. application Ser. No. 822,121.

It may be noted that substantially one-half of the total input from the power turbine-driven transmission shaft 22 is transmitted via the input shaft 26 to the input race 30, while the remaining one-half of the input goes to the other input race 40. The resultant outputs from the output races 34 and 42, respectively drive a sun gear 124 through the output shaft 36, and the carrier 44 directly. The sun gear 124, pinion gears 126 and 130, a pinion shaft 128, and a ring gear 132 comprise a so-called "differential mechanism" 133. The sun gear 124 (FIG. 1) is splined to the right-hand end of the transmission output shaft 36 and meshes with one set of two meshing sets of pinion gears 126, whose shaft 128 is driven by the carrier 44 which, in turn, is driven by the left-hand end of the transmission. The other pinion gear 130 meshes with the ring gear 132.

It should be apparent that, if there were no section-to-section discrepancies, such as might result from accumulation of manufacturing tolerances, exactly half the torque would be applied to the sun gear 124 and half to the carrier 44, the total of the two halves being applied to the ring gear 132. Under these conditions, the sun, pinion and ring gears would act as a unit, without any relative rotation therebetween. However, since discrepancies between toric sections are bound to exist, the resultant speed differences will result in some relative rotation between the carrier 44 and the sun gear 124, the average being applied to the ring gear 132.

An axial loader mechanism 134 is operatively connected to the transmission input shaft and the adjacent outer face 136 of the second or rear input race 40. The axial loader mechanism 134 includes a member 138 splined to the input shaft 26. Converging ramps 140 are formed on the opposing faces 136 of the races 40 and 142 on the member 138. Three ball members 144 are located between the opposing ramps 140. The member 138 is held from axial movement by a nut 148 which is threadedly secured to the right-hand end of the transmission input shaft 26. A Belleville spring 150 is located between the nut 148 and the member 138, thus statically preloading the roller-race contact in compression and the input shaft 26 in tension. It may be realized that, when the transmission input shaft 26 is rotated, the ball members 144 will tend to move circumferentially along the converging ramps 140 on the race 40 and the member 138, thereby urging the axially movable input race 40 against the circumferential edge of the roller 48 as a function of one-half the input torque, as mentioned above.

Inasmuch as the rear spider ring 52 is fixed to the casing 12 as explained above, and the rear rollers 48 are confined by the carrier extension 86 within the walls of their respective grooves 88, the rollers 48 cannot move to the left under the above force of the input race 40. Instead, the slack in the system will be taken up by virtue of the member 138 being forced to the right by the ball members 144, thereby pushing the nut 148 and the associated transmission input shaft 26 to the right. The input race 30 will, as a result, be moved to the right by collar 32, forcing the roller assembly 14 to the right, as permitted by the front ring 52, which is free to "float" or move axially on splines 53 with respect to the housing 12 through the space 151. The roller 46, in turn, forces the output race 34, the output shaft 36 and the sun gear 124 to the right through the collars 38 and 152, respectively. The sun gear 124 will also push the carrier 44 to the right through intermediate needle bearings 154, and the carrier 44 will be forced against the circumferential edge of the roller 48.

The differential ring gear 132 will rotate a bevel input gear 156 which is secured to an axial extension 158 of the ring gear 132. The bevel input gear 156 will, in turn, rotate a mating output bevel gear 160, which rotates on an axis normal to the axis of the extension 158, thereby completing a right-angle output. The bevel input gear 156 is supported axially on bearings 162, and the bevel output gear 160 is supported on bearings 164. An extension 166 of the bevel output gear 160 includes internal splines 168 which mesh with exterior splines 170 formed on a hub 172 of the housing 174 of the torque converter 18. The converter 18 will be located axially by a bolt 176 which is threadedly connected through a central opening 178 in the hub 172 to a threaded opening 180 formed in the bevel output gear extension 166.

The fluid torque converter 18 includes the usual pump 182, turbine 184, stator 186 and sprag clutch 188, the turbine 184 being splined to an output shaft 190 and supported on needle bearings 194. Stator reaction torque is transmitted to ground through the sprag clutch 188 to the stator support shaft 195. The converter housing 174 and pump 182 are supported radially on bearings 196 and 164. Converter thrust load is transmitted to ground through thrust bearings 192 to the bearings 164. It may be noted at this point that while the lower end (FIG. 1) of the converter housing 174 is retained in position, the bearings 196 will permit the housing 174 to extend or "breathe" under the centrifugal differential pressure heads to which it will be subjected during operation.

Inasmuch as the roller assemblies 14 and 15 are unidirectional and, hence, satisfactory for forward movement only, the planetary-type reverse gearing mechanism 20 is utilized to accomplish a reverse vehicular operation. During forward operation, a clutch 198, including discs or plates 197, a piston 199, and return springs 201, mounted on a clutch hub 200 splined to the output shaft 190, is hydraulically engaged, as will be described later, causing the gear sun 202, pinions 203 and 204, and ring gear 206 of the unit 20 to move as a unit, serving as a direct drive connection between the transmission shaft 190 and an output shaft 208 via an output drum 210. For reverse, the forward clutch 198 is disengaged, and a reverse clutch 212, including discs 211, a piston 213 and return spring 215, is hydraulically engaged. As a result, the ring gear 206 will serve as a reaction member, the sun gear 202 will be rotated in one direction by the transmission output shaft 190, causing the pinion gears 204, the carrier 214 and the output drum 210 to reverse, the latter rotatably supported and axially positioned on bearings 217 by a lock nut 219.

A governor 216 (FIG. 4b) is rotatably mounted in any suitable manner on the outer periphery of the axial loader mechanism member 138, and a control pump 218 which supplies fluid to the hydraulic control system 16 (FIGS. 4a and 4b), is operatively connected to the input shaft 26. The pump 218 supplies fluid at pump pressure to the governor 216 by means of a passage 222 (FIGS. 4a and 4b).

Hydraulic Control System

The structural details of the components of the hydraulic control system 16 will now be described without regard, at this point, to the interconnecting passages or to the operation thereof.

Main Pressure Regulator Valve

The main pressure regulator valve assembly 224 includes a housing 226 having a cylindrical bore 228 formed therein, a valve element 230 slidably mounted in the cylindrical bore 228 and a plug 232 fixed in one end thereof. An annular recess 234 is formed on the valve element 230, and a cup-shaped counterbore 236 is formed in one end thereof. An inlet 238 and an outlet 240 are formed in the housing 226, communicating with a chamber 242 around the annulus 234 and by a passage 243 to the closed end of the bore 228 to act on the end of the valve element 230. A central chamber 244 is formed in the plug 232, as well as an axial passage 246 which extends between the chamber 244 and the end of the plug 232 facing the counterbore 236. A pair of springs 248 and 250 are mounted in the counterbore 236 extending from the bottom surface thereof to the opposing face of the plug 232. The springs 248 and 250 are separated by a slidably mounted spacer 252, eliminating the possibility of buckling or other problems if one long spring were used instead of two. A pin member 254 is slidably mounted at one end thereof in the axial passage 246, the other end thereof abutting against the bottom of the cup-shaped counterbore 236.

100 p.s.i. Pressure Regulator Valve

A second pressure regulator valve assembly 256, used to supply the downstream hydraulic control system with substantially 100 p.s.i. fluid pressure, includes a housing 258 having a cylindrical bore 260 formed therein, and a spool valve 262 slidably mounted in the bore 260. A plug 264 is secured in one end of the bore 260, and a spring 266 is mounted around an extension 268 of the spool valve 262 between the fixed plug 264 and the face of a first land 269 formed on the valve body 262. Second and third lands 270 and 272, respectively, are formed along the valve body 262, the lands 269, 270 and 272 being separated from each other by annular grooves 274 and 276. A fluid inlet 278 and a fluid outlet 280 are formed in the housing 258 in the vicinity of the land 272 and the annulus 276. Exhaust ports 282, 284 and 286 are formed in the housing 258 adjacent the lands 270 and 269 and the plug 264, respectively.

Manual Selector Valve

A manual selector valve assembly 288 includes a housing 290 having a bore 292 and a larger diameter chamber 294 formed therein. A multiland spool valve 296 is slidably mounted in the bore 292, a land 298 formed on one end thereof being at times freely mounted in the chamber 294. An exhaust outlet 300 is formed in the housing 290, communicating with the chamber 294. A plurality of lands 302, 304, 306 and 308 are formed on the spool valve 296 cooperating with ports 310, 312, 314, 316, 318, 320 and 322. While their functions will be described in detail later, it should be noted that ports 310 and 314 will alternately supply fluid to reverse and forward clutches 324 and 326, respectively. The land 308 is at times positioned outside the housing 290, opening the outer portion of the bore 292 to exhaust. The outer end 328 of the selector valve 296 may be positioned in any one of four manually selected positions, namely, 1.0, DRIVE, NEUTRAL and REVERSE.

Manual Ratio Valve

A manual ratio valve assembly 330 serves as a regulating valve, providing 1:1 ratio when the above-described manual selector valve assembly 288 is in the 1.0 or REVERSE position. The assembly 330 includes a housing 332 having a cylindrical bore 334 and six ports 336, 338, 340, 342, 344 and 346 formed therein. A spool valve 348, including lands 350, 352 and 354 and a small-diameter extension 356, is slidably mounted in the cylindrical bore 334, controlling the various inlets and outlets of the above-mentioned ports in a manner to be described. A spring 358 is mounted around the extension 356 between the adjacent faces of the land 354 and a fixed plug 360.

Main Ratio Valve

A main ratio valve assembly 362 combines signals from the manual ratio valve assembly 330 with gasifier compressor discharge pressure and turbine engine speed parameters to produce a desired engine operation. The assembly 362 includes a housing 364 having stepped cylindrical bore 366 and seven ports 368, 370, 372, 374, 376, 378 and 380 formed therein. A spool valve 382 includes two identical lands 384 and 386 slidably mounted in an intermediate-diameter 388 of the stepped bore 366, and a third larger-diameter land 390 slidably mounted in the largest-diameter portion 392 of the bore 366, and a small-diameter extension 394 slidably mounted in the smallest-diameter portion 396 formed by the insertion into the stepped bore 366 of a fixed sleeve member 398. A spring 400 is mounted between the end face of the small-diameter extension 394 and a solid end 402 formed on the sleeve member 398, around a stop member 404. An additional port 406 communicates between the spring chamber 408 and the exhaust port 380.

High-Speed Limit Valve

A high-speed limit valve assembly 410 functions to limit the maximum engine speed at, say, 2,550 r.p.m., overruling the main ratio valve 362. The assembly 410 includes a housing 412 having two concentric bores 414 and 416 and a plurality of seven ports 418, 420, 422, 424, 426, 428 and 430 formed therein. A spool valve 432 includes three lands 434, 436 and 438, one of which, namely, the land 438, is slidably mounted in the largest-diameter portion 416, while lands 434 and 436 are slidably mounted in the smaller-diameter bore portion 414. A fixed sleeve 440 is mounted in a bore 442 adjacent the land 438. A pin 444 is slidably mounted in a central opening 446 of the sleeve 440, with one end thereof abutting against the face of the land 438. A spring 448 is mounted between the other face of the land 438 and a fixed abutment 450, urging the valve 432 to the right in FIG. 4b. The valve 432 responds to particular pressures communicated thereto via one or more of the ports 420, 424 and 430, controlling the output pressure through the port 422, in a manner to be described.

Low-Speed Limit Valve

A low-speed limit valve assembly 452 prevents turbine engine speed from remaining below a predetermined value of, say, 1,300 r.p.m., overruling the main ratio valve 362 at this point. The assembly 452 includes a housing 454 having stepped bores 456 and 458 formed therein. A spool valve 460 includes lands 462 and 464 slidably mounted in the smaller bore 456, while a third land 466 is slidably mounted in the larger bore 458. A spring 468 is mounted between a fixed abutment 470 and the face of the land 466. Six ports 472, 474, 476, 478, 480 and 482 are formed in the housing 454 in a manner to be described.

Exhaust Control and Exhaust Limit Valves

These valve assemblies 484 and 486 control the exhaust of the main ratio valve 362 and the low-limit valve 452 in response to compressor discharge pressure. The exhaust control valve 484 includes a housing 488 having a cylindrical bore 490 and five ports 492, 494, 496, 498 and 500 formed therein. A spool valve 502 having lands 504 and 506 formed therein is slidably mounted in the bore 490, controlling either exhaust through the port 498 or flow through the port 494 to the exhaust limit valve assembly 486. A stop member 508 is formed on the left end of the exhaust control valve 502 (FIG. 4a), and a spring 510 is mounted around the stop member 508 between the outer face of the land 504 and a fixed abutment 512.

The exhaust limit valve assembly 486 includes a housing 514 having concentric bores 516 and 518 formed therein. Five ports 520, 522, 524, 526 and 528 are formed in the housing 514 and serve to cooperate with lands 530, 532 and 534 formed on the exhaust limit valve body 536. The land 534 is largest. A stop member 538 is formed on the end of the land 534 and is surrounded by a spring 540 mounted between the outer face of the land 534 and a fixed abutment 542.

Flow Control Valve

A flow control valve assembly 544 receives fluid under pressure from various of the above-described valves in a manner to be described, and controls the outflow of fluid to a servopiston assembly 546 which actuates the toric roller assemblies 14 and 15. The flow control valve assembly 544 includes a housing 548 having a cylindrical bore 550 and a plurality of eight ports 552, 554, 556, 558, 560, 562, 564 and 566 formed therein. A spool valve 568 having three lands 570, 572 and 574 formed therein, is slidably mounted in the cylindrical bore 550, cooperating with the various inlet and outlet ports, as will be described. An extension 576 is formed on one end of the land 574 adjacent a fixed member 578. A spring 580 is mounted around the extension 576 and between the face of the land 574 and the fixed member 578.

Servopiston

The servopiston assembly 546 responds to the regulated pressure signal from the flow control valve assembly 544 to effect the initial inclination of the rollers 46 and 48. The servopiston 118 is slidably mounted in a chamber 584 formed in the housing 586 of the servopiston assembly 546. The servopiston 118 provides a movable wall which is slidably mounted in the chamber 584. A shaft 588 extends from the servopiston 118 through an opening 590 in the housing 586 terminating against one end of a pivotably mounted lever 592, whose other end contacts the exposed extension 594 of a ratio position valve assembly 596. The flat surfaces 122 are formed on opposite sides of the shaft 588. The bellcrank members 114 cooperate with the flat surfaces 122 for rotary movement therewith.

Ratio Position Valve

The ratio position valve assembly 596 generates a fluid pressure proportional to the tilt angle of the toric rollers 46 and 48. The assembly 596 includes a housing 598 having two concentric bores 600 and 602, as well as an inlet port 604 and an outlet port 606 formed therein. A spool valve 608 includes two smaller-diameter lands 610 and 612 and one larger-diameter land 614 for sliding movement in the bores 600 and 602, the land 614 being in the bore 600. A second member 616 is slidably mounted in the larger bore portion 600, the second member 616 including the extension 594 which is contacted by the lever 592 of the servopiston assembly 546. A spring 618, having predetermined rate and force factors, is mounted between opposing ends of the spool valve 608 and the second member 616. A pair of exhaust ports 620 and 622 are formed in the housing 598.

Neutral and Reverse Inhibitor Valve

A neutral and reverse inhibitor valve assembly 624 contacts the outer end 328 of the manual selector valve 288 and prevents it from being shifted into NEUTRAL or REVERSE position above a predetermined engine speed of, say, 1,500 r.p.m. The assembly 624 includes a housing 626 having a spool valve 628 mounted therein. An extension 630 outside the housing 626 is formed on the end of the spool valve 628 for cooperation with a selector plate 632 operatively connected to the manual selector valve body 296. The valve 628 is urged away from the selector plate 632 by a spring 634 mounted between a fixed abutment 636 and a retainer ring 638 mounted on the valve body 628. The valve 628 is movable toward the path of the selector plate 632 by fluid pressure reflective of turbine engine speed communicated through an inlet 640 formed adjacent the left end of the valve 628.

Gasifier Discharge Pressure Valve

A gasifier discharge pressure valve assembly 642 includes a housing 644 having two concentric bores 646 and 648 formed therein. A spool valve 650 is slidably mounted in the smaller-diameter bore portion 646. The spool valve 650 includes three lands 652, 654 and 656, which cooperate with an inlet port 658, an outlet port 660, an exhaust port 662 and a pressure-balancing port 663. The spool valve 650 is urged to the right in FIG. 4b by a spring 664 and to the left by a pushrod 666 mounted through an opening 668 formed in a plug 669 mounted in the bore 648, the right end of the pushrod 666 abutting against a diaphragm 670 which forms movable walls between chambers 672 and 674. The chamber 674 receives, via an inlet 676, a pressure signal reflective of compressor discharge pressure, as sensed by a pivot tube (not shown). The gasifier discharge pressure spool valve 650 responds to the compressor discharge pressure signal and transmits a fluid signal indicative thereof to the above-mentioned main ratio valve 362, for a purpose to be described.

Governor

The governor assembly 216 is operatively connected to the outer periphery of the member 138 of the axial loader mechanism 134, which is driven by the transmission input shaft 26. The governor assembly 216 includes a housing 678 having a pump pressure inlet 680 and an outlet 682 and a cylindrical bore 684 formed therein. A valve body 686 includes lands 688 and 690 which slidably cooperate with the pump pressure inlet 680, the outlet 682 and an exhaust port 692. The valve 686 is moved in response to turbine engine speed via flyweights 694 pivotably mounted on a pivot pin 696, and including an inwardly extending member 698 which contacts the extended end 700 of the valve 686.

Operation of the Hydraulic Control System

The hydraulic system 16 is represented schematically in FIGS. 4a and 4b, and is contained for the most part in the compartment 120 in the housing 12, covered by a cover member 704. The system 16 is subjected to two variable input signals, namely, output or power turbine engine speed via the governor 216, compressor discharge pressure via the gasifier speed valve 642, and a fixed operating condition via the manual selector valve 288. A pump 218, driven by the transmission input shaft 26, supplies fluid under pressure from a sump 706 via passages 708, 710 and 712 to the main pressure regulator valve 224. In order to better control variations in pressure throughout the system, the second or 100 p.s.i. regulator valve 256 may be added to the system 16. In other words, the large variation in flow through the first regulator valve 224 would produce a substantial variation in downstream pressure, thereby detrimentally influencing ratio change by causing a change in the rate thereof, whereas the smaller variation in flow through the second regulator valve 256 produces a more constant operating pressure downstream thereof. The regulator valve 256 receives fluid from the main pressure regulator valve 224 at between 100 and 150 p.s.i. or, say, approximately 125 p.s.i. pressure, via a passage 714 communicating with the passage 712, and a branch passage 716. Pump pressure is directed to the two inlet ports 312 and 320 of the manual selector valve 288 via a passage 718. The fluid at pump pressure will at times be directed toward the outlet 314 and a passage 720 leading to the forward clutch 326, and at other times directed toward the outlet 310 and a passage 722 leading to the reverse clutch 324, depending upon the axial position of the manual selector valve 296. A passage 724 communicates between the reverse clutch 324 and the chamber 244 of the main pressure regulator valve 224 in order to cause a reverse pressure boost, i.e., increased pressure in the chamber 244 on the pin member 254 will promote an increase in pressure in the chamber 242 and, thence, in the lines 712, 714 and 718 and, hence, an increase in pressure on the reverse clutch 324, which may include fewer discs (FIG. 1) than the forward clutch 326. Both the forward clutch outlet 314 and reverse clutch outlet 310 will be closed off from line pressure by the land 302 of the manual selector valve 296 and open to exhaust ports 300 and 316, when the valve is positioned in N or NEUTRAL. In this position the land 306 will be moved to the right of the second mainline inlet 320 in FIG. 4a, permitting the full 125 p.s.i. pump pressure to flow past the outlet 318 into a passage 726 leading to the right-hand end of the flow control valve assembly 544. This will force the flow control valve 568 to the left and hold it there, preventing any other valve in the system from overriding the flow control valve 568 if the engine were revved up while in NEUTRAL. Accordingly, fluid at 100 p.s.i. regulated pressure will flow from the 100 p.s.i. pressure regulator valve 256, via passages 728, 730 and 732, through the low-ratio port 556 into a passage 734 leading to the left chamber 584 adjacent the servopiston 118. The resultant rightward movement of the servopiston 118 will cause the bellcrank members 114, their associated shaft 104 (FIG. 3) portions 108 and 110, the lever arms 102 and control collars 90 to rotate, and thereby cause the rollers 46 and 48 to be positioned so as to produce a decreased output speed/input speed ratio, in the manner described above, the ratio being on the order of 0.4:1. This permits a high engine idle speed, as required for continuous operation of the plurality of engine accessories, represented generally at 278 in FIG. 1, without any output rotation from the torque converter 18.

Assume now that the operator positions the end 328 of the manual selector valve assembly 288 in the D or DRIVE position, initially assuming a light throttle or idle condition. Under these conditions, the manual selector valve body 296 will be in the position illustrated in FIG. 4a. As illustrated, pump pressure will now be transmitted to the forward clutch 326 via the outlet 314 and the passage 720, and to a passage 736 leading to the right-hand end of the manual ratio valve assembly 330. This pressure, in conjunction with the leftward force of the spring 358, will move the manual ratio spool valve 348 all the way to the left. In this condition, 100 p.s.i. pressure received by the valve assembly 330 from the 100 p.s.i. regulator valve 256 via passages 728 and 738, will be free to flow through the outlet 342 into a manual ratio error passage 740 leading to the main ratio valve assembly 362. So long as the turbine engine speed signal, which is transmitted from the governor 216 to the portion of the bore 366 to the right of the land 390 of the main ratio valve 362 via passages 742 and 744, remains low, and therefore does not substantially assist the leftward force of the spring 400, only a very small value of manual ratio error pressure from the passage 740 will flow past the land 384 to the outlet 372 and a passage 746, and thence into the high-speed limit valve assembly 410. The main ratio valve 362 will try to regulate to control a predetermined pressure, say, 40 p.s.i., through the outlet 372. In the process, it will intermittently exhaust through the outlet 374 to a passage 748 and thence to a passage 750 into the exhaust control valve assembly 484, past the land 504 and through the exhaust outlet 498 to atmospheric pressure, since compressor discharge pressure is low at this point and the spool valve 502 is able to be moved to the right by the spring 510. Since the pressure representative of the turbine engine speed, received by the high-speed limit valve 410 via the passage 742, and the inlet 430 adjacent the right-hand end of the pin 444 abutting against the spool valve 432, is low, the spring 448, whose left end is mounted against a wall 450 of the valve housing 412, will move the valve 432 all the way to the right, permitting communication between the passage 746 and a passage 752, wherein the resultant high-limit error pressure is communicated to the low-speed limit valve assembly 452 which will serve as a regulating valve so long as the engine r.p.m. is less than a predetermined value, say, 1,300 r.p.m. The main ratio valve 362 will intermittently exhaust past the land 386 into the exhaust passage 748. Regulated pressure will now be communicated from the passage 752 past the land 462 of the low-speed limit valve spool 460 to the outlet 476 into a passage 754 and thence to the left-hand end of the flow control valve assembly 544. This relatively low pressure will be opposed at this point by the force of the spring 580 urging the flow control valve body 568 to the left, allowing the line pressure from the passages 730 and 732 to flow past the land 572 through the low-ratio port 556 into the passage 734 leading to the left-hand portion of the chamber 584 adjacent the servopiston 118. The resultant underdrive ratio of output speed/input speed is maintained between approximately 0.4:1 and 2:1, the ratio being determined by the resultant actuation of the above-described bellcranks 114, shaft portions 108 and 110 of the shaft 104, lever arms 102 and collars 90 for positioning the rollers 46 and 48.

Assume now that the operator further depresses the throttle (not shown). Compressor discharge pressure will immediately increase, and the pressure signal thereof will be communicated from the gasifier speed valve assembly 642 via a passage 756 to the main ratio valve assembly 362 on the left side (FIG. 4b) of the land 390. This will move the main ratio valve 382 to the right, compressing the spring 400 and thereby reducing the outlet pressure in the passage 746. So long as engine speed remains less than a predetermined value, such as 2,550 r.p.m., the pressure from the passage 746 will be transmitted through the inlet 424, past the land 436 of the high-speed limit valve 432, through the outlet 422 and into the passage 752, through the inlet 474 and the outlet 476 of the inactive low-speed limit valve 452, into the passage 754 and thence to the left-hand end of the flow control valve assembly 544. The low-speed limit valve 452 will have become inactive when the governor pressure on the right-hand end thereof, from passages 742 and 757, is indicative of the 1,300 r.p.m. speed. 100 p.s.i. line pressure received by the flow control valve assembly 544 via passages 728, 730 and 732, will thereupon be supplied through the outlet 556 of the flow control valve assembly 544, through a passage 758, to the servochamber 584 adjacent the left-hand end (FIG. 4b) of the servopiston 118. This will cause a toric ratio change which, in turn, will increase turbine engine speed. As the engine speed increases, the resultant fluid-responsive pressure signal from the governor 216 through the passages 742 and 744, into the chamber of the bore 392 adjacent the right side of the land 390 of the main ratio control valve assembly 362, once again returning the valve 382 to its original balanced position, increasing the pressure in the passage 746 to its former 40 p.s.i. value. This pressure signal will be transmitted via the above-described route to the chamber 584 to the left of the servopiston 118, stopping the ratio shift at a point corresponding to the new engine operating condition for the new throttle setting.

At speeds above the 2,550 r.p.m. high-speed limit, 100 p.s.i. fluid from the passage 728 will flow past the land 434 of the high-speed limit valve spool 432 into the passage 752. The passage 752, as explained above, will communicate the fluid through the inlet 474 and the outlet 476 of the low-speed limit valve 452 to the passage 754 leading to the left-hand end of the flow control valve assembly 544, opening the overdrive port 560 to 100 p.s.i. line pressure and the low-ratio port 556 to the exhaust outlet 554. The 100 p.s.i. pressure will flow through the passage 758 to the servochamber 584, moving the servopiston 118 to the left, resulting in a corresponding change in rollers 46 and 48 tilt which decreases engine speed.

For normal driving and acceleration, toric speed ratios below 1:1, line C in FIG. 5, are not required. The exhaust control and exhaust limit valves, 484 and 486, respectively, limit the toric low-speed ratio to 1:1. The exhaust valves 484 and 486 accomplish this by limiting the exhaust of the main ratio and low-speed limit valves, 362 and 452, respectively, with the pressure generated in the exhaust limit valve 486, i.e., 80-ratio position pressure, 80 p.s.i. being the effect of the force of the spring 540 on the spool valve 536 and ratio position pressure being communicated from the ratio position valve 596 via the passage 760 to the annular chamber formed between the lands 532 and 534 of the spool valve 536. As compressor discharge pressure received via a passage 759 from the gasifier valve 642 rises, the exhaust control valve 502 moves to the left connecting the passage 494 to passage 496, permitting the 80-ratio position pressure to be communicated via the passages 750 and 748 to the low limit valve assembly 452 and thence to the flow control valve assembly 544 via the passage 754 for roller 46 and 48 position control through the servopiston 118. In other words, any time the ratio position pressure falls below 40 p.s.i., indicating a speed ratio of less than 1:1, 80-ratio position pressure will be greater than 40 p.s.i. and the main ratio and low-speed limit valves 362 and 452, respectively, will not be able to generate an error pressure less than 40 p.s.i. As a result, the toric ratio will be moved to 1:1 and maintained there. If the toric speed ratio is more than 1:1, ratio position pressure is over 40 p.s.i. Therefore, 80-ratio position pressure is less than 40 p.s.i., and the toric unit can be shifted between the 1:1 ratio and some higher output/input speed ratio, such as between the 1:1 line C and the 2:1 dash line D of FIG. 5, but not below the 1:1 ratio represented by line C.

Assume now that the operator places the manual selector valve 296 in the 1.0 position, which may be selected when the operator wishes to downshift the toric unit, such as for passing or downhill braking. Fluid at mainline pressure will flow through the outlet 314 and the passage 720 to the forward clutch 326. The passage 736 leading to the manual ratio valve 330 will now be blocked off from communication with the pump pressure passage 718. This will release fluid at pump pressure from the chamber at the right end of the bore 334 of the manual ratio valve 330 through the now open right-hand end of the selector valve assembly 288 and allow the spring 400 to exert a leftward force on the valve spool 382 equivalent to 40 p.s.i., which is the pressure designated to hold the toric ratio at 1:1. So long as the ratio position pressure in the annulus between the lands 350 and 352 of the manual ratio valve 348 transmitted from the ratio position valve 596 via a passage 760 remains at 40 p.s.i., i.e., indicative of the 1:1 toric ratio, the manual ratio spool valve 348 will be in the position illustrated. If ratio position pressure varies above or below 40 p.s.i., the manual ratio valve 348 will function to regulate the manual error pressure accordingly, from the line passage 738, past the land 352, to the outlet 342 and the passage 740 leading to the main ratio valve assembly 362. The main ratio valve assembly 362 will thereupon combine the pressure thus provided, with compressor discharge pressure and turbine engine speed pressure signals entering the valve assembly 362 on opposite sides of the land 390, and transmit the proper pressure signal from the passage 740, past the land 384, to the outlet 372 and the passage 746 and thence to the high-speed limit valve assembly 410 which controls the high-limit error pressure through the passage 752 and thence through the now fully open low-speed limit valve 452 to the passage 754 leading to the left end of the flow control valve assembly 544. The latter will actuate the servopiston 118 as required until ratio position pressure from the ratio position valve assembly 596 and the force of the spring 400 on the main ratio spool valve 382 are once again balanced for the 1:1 ratio.

If the operator were now to position the manual selector valve 296 in R or REVERSE, communication between mainline passage 718 and the passage 736 leading to the manual ratio valve 330 would now be blocked by virtue of the land 306 of the manual selector spool valve 296 being positioned therebetween. Mainline fluid would, however, be communicated via the outlet 310 and the passage 722 to the reverse clutch 324, with the outlet 314 to the forward clutch 326 being blocked by the land 302. The other valves in the system will now function in the same manner as was described above relative to the 1.0 or LOW selector valve 296 position.

The neutral and reverse inhibitor valve 624 includes the spring 634 which urges the spool valve 628 to the right in FIG. 4a such that the extension or pawl 630 thereof is located adjacent a selector plate 632 operatively connected to the extended end 328 of the manual selector valve assembly 288. A branch passage 762 communicates between the governor pressure passage 756 and the chamber 640 adjacent the left end (FIG. 4a) of the valve 628. Once turbine engine speed reaches a predetermined value, say, 1,500 r.p.m., the fluid pressure representative of speed will enter the chamber 640 via the passages 742, 756 and 762 leading from the governor 216. The additional pressure on the left end of the inhibitor valve 628 will move the valve 628 to the right, against the force of the spring 634, and cause the pawl 630 to block the rotational path of the selector plate 632. This prevents the vehicle operator from being able to move the manual selector valve 296 into either the NEUTRAL or REVERSE positions, so long as turbine engine speed remains above 1,500 r.p.m.

Regardless of the position of the main pressure regulator valve 224, fluid from the pump 218 will always be available to the fluid torque converter 18 via a passage 764 including a restriction 766 and communicating with the pump feed passage 712.

Lubrication System

Regardless of the position of the main pressure regulator valve element 230, fluid from the pump 218 will always be available for the purpose of lubricating the toric sections 14 and 15, represented schematically in FIG. 4a and in detail in FIG. 1.

Referring to FIG. 4a, it may be noted that a passage 768, including a restriction 770, communicates between the pump feed passage 712, and an annulus 772 formed around the main pressure regulator valve element 230. A passage 774 including an oil cooler 776 communicates between the annulus 772 and the toric sections 14 and 15.

Referring now to FIG. 1, it may be noted that the oil from the passage 774 enters the toric sections 14 and 15 at the central radial passage 76 formed through the hub 54 and the mast 74. The fluid is communicated to a port 778 formed in the member 58, and to angled passages 780 and 782 formed in the extension 66. The latter passages communicate with the radial opening 76 in the hub 54 such that they project oil toward the input and output races 30, 40 and 34, 42, respectively, on the underside of the rollers 46 and 48. Additional angled passages 784 and 786 are formed in the extensions 86 of the carriers 80 just outside the cam grooves 88, such that the passages 784 and 786 project oil supplied through a passage 788 which communicates with the central passage 76, toward the input race 30 or 40 and the output race 34 or 42 on the upper sides of the rollers 46 or 48.

It should be apparent that the toric transmission described above represents a novel means for transmitting power from a prime mover, such as a gas turbine engine, for driving a bus or a truck without any "shift feel" or noticeable change in inertia, and with minimal noise characteristics.

It should be further apparent that the invention provides suitable and satisfactory means for operating a plurality of vehicle accessories while the engine is idling.

It should also be apparent that a prime mover other than a gas turbine engine, such as a steam diesel, or gasoline engine, for example, could be employed, wherein the parameters would include, along with engine speed, rack position, throttle position and vacuum, respectively.

While but one embodiment of the invention has been shown and described, other modifications thereof are possible.

We claim:

1. A toric transmission for use with a prime mover, said transmission comprising a housing, input shaft means extending into said housing from said prime mover, a pair of input races secured to said input shaft means, an output race opposing each of said pair of input races, a set of rollers frictionally rotatable and tiltable between each set of input and output races for permitting continuously variable output/input speed ratios, hydromechanical control means operatively connected to said rollers for automatically changing the tilt position of said rollers in response to a plurality of variable input parameters, output means operatively connected to said output races, a fluid torque converter operatively connected to said output means for receiving the rotary output from said output races for torque multiplication thereof, a final output shaft for receiving the output from said converter, first clutch means for connecting said final output shaft to said converter for forward operation, and second clutch means for connecting said final output shaft to said converter for reverse operation.

2. A toric transmission for use with a prime mover, said transmission comprising a housing, input shaft means extending into said housing from said prime mover, a pair of input races secured to said input shaft means, an output race opposing each of said pair of input races, a set of rollers frictionally rotatable and tiltable between each set of input and output races for permitting continuously variable output/input speed ratios, hydromechanical control means operatively connected to said rollers for automatically changing the tilt position of said rollers in response to a plurality of variable input parameters, output means operatively connected to said output races, differential means operatively connected to said output means for averaging speed differences between said respective sets of races and rollers as received from said output shaft means, a fluid torque converter for receiving the rotary output from said differential means for torque multiplication thereof, gear means operatively connected to said differential means for transferring said rotary output from said differential means to said fluid torque converter, a final output shaft for receiving the output from said converter, first clutch means for connecting said final output shaft to said converter for forward operation, and second clutch means for connecting said final output shaft to said converter for reverse operation.

3. The toric transmission described in claim 2, and axial loader means operatively connected to one of said races and to one of said input shaft and output means for maintaining said rollers in frictional contact with said races.

4. The toric transmission described in claim 2, wherein said differential means and said output means include a sun gear operatively connected to one of said output races, a carrier operatively connected to the other of said output races, a plurality of pinion gears rotatably connected to said sun gear and to said carrier, and a ring gear rotatably connected to said pinion gears.

5. The toric transmission described in claim 4, wherein said gear means includes a first bevel gear secured to said ring gear and a second bevel gear secured to said fluid torque converter and meshing with said first bevel gear.

6. The toric transmission described in claim 2, wherein said hydromechanical control means includes support means secured to said housing, a ratio control collar rotatably mounted in said support means parallel to and intermediate each set of input and output races, mast means secured to said support means and extending into the center of each of said rollers, carrier means pivotably mounted on each of said mast means in said center and including an extension pivotably connected to said collar, bearing means mounted on each of said carrier means for rotatably supporting one of said rollers, linkage means operatively connected to said collar for rotating said collar and thereby inclining said extension, carrier and roller, and hydraulic means operatively connected to said linkage means for actuating said linkage means.

7. The invention defined in claim 6, wherein said hydraulic means includes governor means providing a signal indicative of input speed, second means providing s signal indicative of a second parameter under all operating conditions, and ratio regulating valve means for regulating a ratio pressure varying with said governor speed signal and said second parameter signal and supplying a resultant signal for actuating said linkage means.

8. In a transmission, an input, an output, a fluid-operated continuously variable transmission connecting said input to said output and having fluid motor means to continuously vary the ratio drive, a source of fluid under pressure, governor means providing a governor speed signal varying with engine speed, torque demand means providing a torque demand signal varying with torque demand over the complete power range, a ratio regulator valve means for regulating a ratio signal pressure varying with said governor speed signal and said torque demand signal, and means responsive to said ratio signal pressure acting on said fluid motor means to continuously vary said ratio drive.

9. The invention defined in claim 8 and speed control valve means for further controlling said ratio signal pressure in accordance with transmission speed.

10. The invention defined in claim 8 and high speed control valve means for controlling said ratio signal pressure to limit the high transmission input speed.

11. The invention defined in claim 8 and low speed control valve means for reducing the ratio signal pressure in a low transmission speed ratio.

12. The invention defined in claim 8 and forward and reverse clutches for alternately controlling the direction of rotation of said output, and manual selector valve means for supplying said fluid under pressure to one of said clutches in response to the manual selection of one of a plurality of operational drive conditions.

13. The invention defined in claim 12 and inhibitor means operatively connected to said manual selector valve means and responsive to said governor speed signal for preventing said manual selector valve means from being moved into at least one of said operational drive conditions at and above a predetermined input speed.

14. The invention defined in claim 8 and flow control valve means for receiving the signal from said ratio regulator valve means and applying same to said means responsive to said ratio signal pressure to control the direction of variation of said ratio drive.

15. The invention defined in claim 14 and a servopiston responsive to the fluid signal from said flow control valve for actuating said fluid motor at times in one of two directions of variation of said ratio drive and at times in the other of said two directions of variation of said ratio drive.

16. The invention defined in claim 15 and ratio position valve means operatively connected to said servopiston for transmitting a fluid signal representative of the ratio drive position.

17. The invention defined in claim 16 and exhaust valve means operatively connected to said ratio regulator valve means and responsive to said ratio position valve means and to one of said governor and torque demand means for preventing ratio drive positions of less than 1:1 output/input speed ratio during normal driving and acceleration.

18. A toric transmission for use with a prime mover, said transmission comprising a housing, input means extending into said housing from said prime mover, an input race secured to said input means, an output race, a roller frictionally rotatable and tiltable between said races for providing continuously variable output/input speed ratios, output means secured to said output race, and hydraulic control means operatively connected to said rollers for changing the tilt position of said rollers in response to a plurality of variable input parameters from said prime mover, said hydraulic control means including a source of fluid under pressure, manual selector valve means for receiving said fluid under pressure and selecting any one of one neutral, two forward and one reverse drive conditions, a servopiston operatively connected to said rollers for actuating the tilt of said rollers alternately in increasing and decreasing speed ratio directions, flow control valve means for directing fluid to said servopiston for reciprocal operation thereof, governor means for providing a fluid signal indicative of input speed, torque demand means for providing a fluid signal indicative of torque demand over the complete power range, valve means responsive to said torque demand and said speed signals for providing regulated pressure to said flow control valve means when said manual selector valve means is in one of said two forward positions.

19. In a transmission, an input, an output, a fluid-operated continuously variable transmission section connecting said input to said output, and having hydraulic means operatively connected to said continuously variable transmission section to continuously vary the drive ratio, said hydraulic means including pump means for supplying fluid under pressure, a centrifugally-operated governor for receiving said fluid under pressure and transmitting said fluid therefrom at a pressure reflective of engine speed, a gasifier discharge pressure valve for receiving said fluid under pressure and transmitting said fluid therefrom at a pressure reflective of compressor discharge pressure, and valve means for receiving said fluid under pressure and said fluid under pressures reflective of engine speed and compressor discharge pressure and regulating same to transmit a fluid signal to said continuously variable transmission section indicative of the combination thereof for moving said continuously variable transmission section to a new output/input speed ratio position to produce a desired engine operation.

20. In a transmission, an input, an output, a fluid-operated continuously variable position-sensitive toric section connecting said input to said output, linkage means operatively connected to said position-sensitive toric section, hydraulic means operatively connected to said linkage means for actuating said linkage means to continuously vary the drive ratio of said position-sensitive toric section, said hydraulic means including pump means for supplying fluid under pressure, a centrifugally-actuated governor for receiving said fluid under pressure and transmitting said fluid therefrom at a pressure reflective of engine speed, a gasifier discharge pressure valve for receiving said fluid under pressure and transmitting said fluid therefrom at a pressure reflective of compressor discharge pressure, and valve means for receiving said fluid under pressure and said fluid under pressures reflective of engine speed and compressor discharge pressure and regulating same to transmit a fluid signal to said linkage means indicative of the combination thereof for actuating said linkage means to move said position-sensitive toric section to a new output/input speed ratio position to produce a desired engine operation, and a torque converter for receiving said output from said position-sensitive toric section for permitting large accessory speeds to be handled on the input side of said transmission with substantially no effect beyond said position-sensitive toric section.